United States Patent
Bookless et al.

(10) Patent No.: US 11,292,559 B2
(45) Date of Patent: Apr. 5, 2022

(54) POSITIONING AT LEAST ONE VEHICLE IN RELATION TO A SET OF MOVING TARGETS

(71) Applicant: BAE SYSTEMS plc, London (GB)

(72) Inventors: John Paterson Bookless, Bristol South Gloucestershire (GB); Markus Deittert, Bristol South Gloucestershire (GB)

(73) Assignee: BAE SYSTEMS PLC, London (GB)

( * ) Notice: Subject to any disclaimer, the term of this patent is extended or adjusted under 35 U.S.C. 154(b) by 148 days.

(21) Appl. No.: 16/757,485

(22) PCT Filed: Oct. 24, 2018

(86) PCT No.: PCT/GB2018/053068
§ 371 (c)(1),
(2) Date: Apr. 20, 2020

(87) PCT Pub. No.: WO2019/081921
PCT Pub. Date: May 2, 2019

(65) Prior Publication Data
US 2021/0129953 A1    May 6, 2021

(30) Foreign Application Priority Data

Oct. 24, 2017 (EP) .................................. 17275171
Oct. 24, 2017 (GB) .................................. 1717450

(51) Int. Cl.
*G05D 1/02* (2020.01)
*B63B 79/40* (2020.01)

(52) U.S. Cl.
CPC ........... *B63B 79/40* (2020.01); *G05D 1/0206* (2013.01); *G05D 1/0212* (2013.01)

(58) Field of Classification Search
CPC ..... B60K 31/0008; B60Q 1/52; G01S 13/931; G01S 2013/9325; G01S 2013/9353;
(Continued)

(56) References Cited

U.S. PATENT DOCUMENTS 5,680,118 A * 10/1997 Cusumano ............ G01S 13/931
340/903
10,514,706 B2 * 12/2019 Schuh ..................... G01S 19/14
(Continued)

FOREIGN PATENT DOCUMENTS

EP     3128386 A1    2/2017
WO     2019081921 A1    5/2019

OTHER PUBLICATIONS

Beak et al., Optimal path planning of a target-following fixed-wing UAV using sequential decision processes, 2013, IEEE, p. 2955-2962 (Year: 2013).*

(Continued)

*Primary Examiner* — McDieunel Marc
(74) *Attorney, Agent, or Firm* — Finch & Maloney PLLC (57) ABSTRACT

A method and system for positioning a vehicle in relation to each moving target of an ordered set of moving targets. Each of the moving targets moves from an initial position at a constant velocity. Embodiments can compute an estimated time for the vehicle to be positioned within a predetermined proximity of one of the moving targets; compute an estimated location of the moving target at the estimated time, based on a current position of the moving target and the constant velocity of the moving target, and compute a required velocity for the vehicle to move from its current position to reach the estimated location by the estimated time. If the required velocity is less than or equal to a maximum velocity of the vehicle, outputting the estimated time and the estimated location for use in positioning the vehicle.

20 Claims, 4 Drawing Sheets (58) Field of Classification Search
CPC .. G01S 2013/9367; G01S 19/48; G01S 19/41; G01S 19/43; G01S 19/51; G01S 19/45; G01S 5/0027; G01S 19/47; G01S 5/0294; G01S 19/19; G08G 1/166; G08G 5/006; G08G 5/0069; B60W 2750/308; Y02T 10/84; G05D 1/12; G05D 1/0094; B64C 39/024; B64C 2201/127; B64C 2201/141; H04N 5/23299; H04N 5/23206; H04N 5/247; H04N 5/23218; H04N 21/21805
See application file for complete search history.

(56) References Cited

U.S. PATENT DOCUMENTS

| | | | |
|---|---|---|---|
| 2004/0006424 A1* | 1/2004 | Joyce | H04N 5/23299 701/408 |
| 2006/0149455 A1 | 7/2006 | Sawada | |
| 2010/0204870 A1 | 8/2010 | Saeki | |
| 2017/0038781 A1* | 2/2017 | Querejeta Masaveu | G08G 5/006 |
| 2017/0363738 A1* | 12/2017 | Kaino | G01S 13/343 |
| 2018/0284293 A1* | 10/2018 | Pan | G01S 19/51 |
| 2019/0277946 A1* | 9/2019 | Hodges | G05D 1/0212 |
| 2020/0294404 A1* | 9/2020 | Bookless | G08G 5/0013 |
| 2021/0011150 A1* | 1/2021 | Bialer | G01S 13/865 |

OTHER PUBLICATIONS

Jung et al., Ground moving target displacement compensation in the DPCA based SAR-GMTI system, 2009, IEEE, gp. 1-4 (Year: 2009).*

Coraluppi et al., A hybrid-state estimation algorithm for multisensor target tracking, 2000, IEEE, p. (Year: 2000).*

Kim et al., Ground moving target displacement compensation for DPCA based SAR-GMTI system, 2009, IEEE, p. (Year: 2009).*

International Preliminary Report on Patentability received for PCT Application No. PCT/GB2018/053068. dated May 7, 2020. Updated—May 13, 2020. 7 pages.

International Search Report and Written Opinion received for PCT Application No. PCT/GB2018/053068. dated Jan. 25, 2019. 12 pages.

GB Search Report under Section 17(5) received for GB Application No. 1717450.9 dated Apr. 24, 2018. 3 pages.

Extended European Search Report received for EP Application No. 17275171.1, dated Mar. 22, 2018. 7 pages.

* cited by examiner

POSITIONING AT LEAST ONE VEHICLE IN RELATION TO A SET OF MOVING TARGETS

The present invention relates to positioning at least one vehicle in relation to a set of moving targets.

It can be desirable to position vehicles in an at least partly autonomous manner. For instance, a task may comprise automatically positioning one or more vehicle in relation to a set of moving targets. Uncertainty about the location of a moving target can conventionally cause problems when trying to compute the distance to moving targets that are the subject of subsequent tasks. This makes it very difficult to schedule sequences of tasks, where a vehicle is to be sequentially positioned in relation to a plurality of moving targets in a set. As a result, conventional planning systems reduce their planning horizon (the size of the planning horizon is typically the number of tasks assigned to a given vehicle in a plan) to a single task when dealing with moving tasks/targets.

A short planning horizon and uncertain schedules have a number of negative aspects. For instance, plan optimality is reduced, as the planner cannot select tasks for a vehicle with future tasks in mind. In other words, less work is completed in a give amount of time. Further, fuel expenditure constraints are more difficult to take into account. In some cases, safety can also be compromised as the vehicles will have to receive further plan updates before they can be recovered. Thus, communication links must be available at any point, which is not always practical.

Embodiments of the present invention are intended to address at least some of the above technical problems.

Embodiments can automatically compute positions for one or more vehicles, as well as generate an optimal task execution schedule. A task typically comprises positioning a vehicle within a predetermined proximity of a moving target, e.g. in order to observe it or perform some other operation in relation to it. For example, in embodiments relating to intelligence gathering missions, a number of vehicles are intended to observe a number of moving targets. The number of targets can be greater than the number of vehicles and so each target will be observed and later re-observed.

The task execution schedule and the task locations are normally linked because the targets are moving and sufficient time has to be provided in the execution schedule in order to enable the executing vehicle to move from task to task. In some embodiments the scheduling and localisation problem is formulated as a Mixed-Integer Linear Programming problem/solution.

According to one aspect of the present invention there is provided a (computer-implemented) method of positioning a vehicle in relation to each moving target of an ordered set of moving targets, wherein each of the moving targets moves from a respective initial position at a respective constant velocity, the method comprising:
i) computing an estimated time for the vehicle to be positioned within a predetermined proximity of one of the moving targets;
ii) computing an estimated location of the moving target at the estimated time, based on a current position of the moving target and the constant velocity of the moving target;
iii) computing a required velocity for the vehicle to move from its current position to reach the estimated location by the estimated time, and iv) if the required velocity is less than or equal to a maximum velocity of the vehicle, outputting the estimated time and the estimated location for use in positioning the vehicle.

The method may further comprise adjusting the estimated time if the required velocity is not less than or equal to the maximum velocity of the vehicle, and repeating steps ii)-iv).

The method may further comprise repeating steps i)-iv) for each subsequent moving target in the set, wherein the current position of the vehicle is taken to correspond to the estimated location of a previous moving target in the set.

The method may further comprise repeating the steps i)-iv) for a plurality of vehicles, where each of the plurality of vehicles is associated with its own ordered set of moving targets.

The steps i)-iii) may be performed by solving an optimisation problem. The optimisation problem may comprise determining/seeking:
a first time and a first position, and a second time and a second position, which meet conditions that:
the first position is within a predetermined proximity of a location of the first moving target at the first time;
the second position is within the predetermined proximity of a location of a second moving target at the second time, and
a distance between the first position and the second position is no greater than a distance the vehicle can travel at, or below, a maximum velocity of the vehicle for a duration equal to or less than a difference between the second time and the first time, and/or
a difference between the second time and the first time is no greater than a time taken for the vehicle to travel from the first position to the second position at, or below, a maximum velocity of the vehicle.

The optimisation problem may be represented by an expression:

$$\min_{t,\, p,\, dp,\, dt,\, t_{start},\, t_{end}} f = \sum_{i=1}^{NV} t_{end}(i) - t_{start}(i) + 0.001 \cdot t(i)$$

wherein:

| | |
|---|---|
| t | represents the estimated time; |
| p | represents a position of a said moving target, where p(i) = [x, y] denotes that the $i^{th}$ moving target is located at position [x, y] at time $t_i$ = x; |
| $t_{end}$ | represents task completion time for each of the plurality of vehicles; |
| $t_{start}$ | represents a start time for each of the plurality of vehicles; |
| Dp | represents an inter-task distance matrix, where dp(i, j) = [dx, dy] denotes that a distance vector [dx, dy] between the $i^{th}$ and $j^{th}$ moving targets at their respective execution times, and |
| Dt | represents time difference between interception of the moving targets by a said vehicle, where dt(i, j) = x denotes that the execution times of moving target i and moving target j differ by an amount of x. |

A constraint on valid/acceptable solutions to the optimisation problem may be expressed by:

$$m \in [1 \cdots M],\, i \in \left[1 \cdots n_t\right],\, \forall j \in [1 \cdots n_t],$$

-continued $$dp(i, j, 1) \cdot \sin\left(\frac{2\pi m}{M}\right) + dp(i, j, 2) \cdot \cos\left(\frac{2\pi m}{M}\right) \leq dt(i, j) \cdot v_{max}$$
$$\forall a \in \left[1 \cdots n_v\right], x(a, i, j) = 1 \text{ and } i \neq j$$

wherein:

M represents a number of polygon edges used in a circle approximated by polygons, with a vector magnitude limit being implemented by forcing the vector to reside within the area of the circle, and $V_{max}$ represents the maximum velocity.

The optimization problem may be solved using a processor executing a Linear Programming optimization solver.

According to another aspect there is provided a (computer-implemented) method of positioning a vehicle in relation to each moving target of an ordered set of moving targets, the method including solving an optimisation problem substantially as described herein.

The optimisation problem may comprise determining/seeking:

a first time and a first position, and a second time and a second position, which meet conditions that:

the first position is within a predetermined proximity of a location of the first moving target at the first time;

the second position is within the predetermined proximity of a location of a second moving target at the second time, a distance between the first position and the second position is no greater than a distance the vehicle can travel at, or below, a maximum velocity of the vehicle for a duration equal to or less than a difference between the second time and the first time, and/or a difference between the second time and the first time is no greater than a time taken for the vehicle to travel from the first position to the second position at, or below, a maximum velocity of the vehicle.

According to another aspect there is provided a computer program product comprising instructions which, when the program is executed by a computer, cause the computer to carry out methods substantially as described herein.

Other aspects of the invention may provide a vehicle, or vehicle control system, configured to receive and execute signals representing positions output by a methods substantially as described herein.

According to another aspect of the present invention there is provided a system adapted to position a vehicle in relation to a set of moving targets, the system comprising at least one processor configured to:

i) compute an estimated time for the vehicle to be positioned within a predetermined proximity of one of the moving targets;

ii) compute an estimated location of the moving target at the estimated time, based on a current position of the moving target and the constant velocity of the moving target;

iii) compute a required velocity for the vehicle to move from its current position to reach the estimated location by the estimated time, and iv) if the required velocity is less than or equal to a maximum velocity of the vehicle, output the estimated time and the estimated location for use in positioning the vehicle.

The system may further include a communications interface configured to transfer signals representing the estimated time and the estimated location to at least one vehicle.

According to a further aspect there is provided a vehicle (e.g. an at least partly autonomous vehicle, or a manned vehicle) that includes a component, such as a computing device or control system, configured to execute a method substantially as described herein.

The vehicle may be at least partly autonomous. The vehicle may comprise a water-borne vessel, for example.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF THE FIGURES

Figure 1:
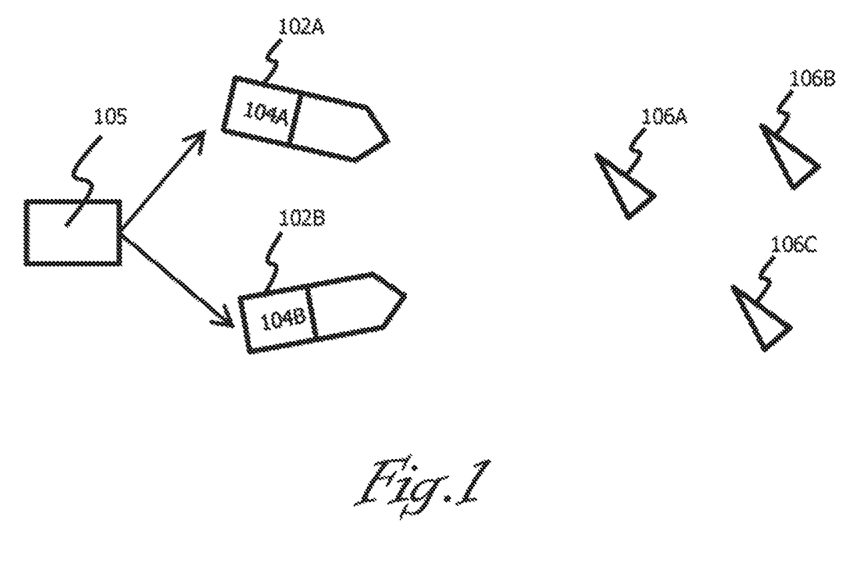
FIG. 1 schematically illustrates a set of vehicles and a set of moving targets.

FIG. 1 schematically illustrates a set of vehicles 102A, 102B. In the example these vehicles comprise Unmanned Surface Vehicles (USVs), although it should be understood that the number (one or more) and type of vehicles can vary.

Each of the vehicles 102A, 102B comprises a control system 104A, 104B that includes circuitry or the like to directly control one or more positioning components/sub-systems of the vehicle, including ones that can control the direction and speed of the vehicle, thereby allowing it to function as an at least partly autonomous vehicle. That is, the positioning of the vehicle may be directly automatically controlled by computer-generated signals, rather than by a human operator. The extent of the autonomous control can vary. For example, the direction and/or speed of the vehicle may be controlled by computer-generated signals, whilst other features or sub-systems of the vehicle may be under (local or remote) human control. Also, it may be possible to switch the vehicle between fully-autonomous, partly-autonomous and/or manual control methods.

Each of the control systems 104 may generate its own control signals, or may receive them from a remote source (e.g. over a wireless communications network), such as from a mission planner system 105. In other embodiments, a control system onboard one of the vehicles may generate control signals that are transferred to others of the control systems, or two or more of the control systems may cooperate in order to generate control signals for the vehicles.

FIG. 1 also illustrates a set of moving targets 106A, 106B, 106C. The moving targets may be under (local or remote) human control, and/or may be at least partly autonomous. The moving targets may be of different types to each other and, again, it should be understood that the number (one or more) and type of targets are merely exemplary. For exemplary embodiments, it will be assumed that each of the targets move in a straight line at a constant velocity from an initial location that are known to the mission planner system 105, for example; however, this can vary in other embodiments. The initial positions and the constant velocities need not be the same for all of the moving targets.

In the example of FIG. 1, the vehicles 102 and the moving targets 106 comprise water-borne vessels, such as USVs, ships, boats or submarines. However, it will be appreciated that in other embodiments, the types of the vehicles may vary, and they may include various kinds of land-based (e.g. all-terrain vehicles, etc) and/or airborne vehicles (e.g. airplanes, helicopters, drones, etc).

Figure 2:
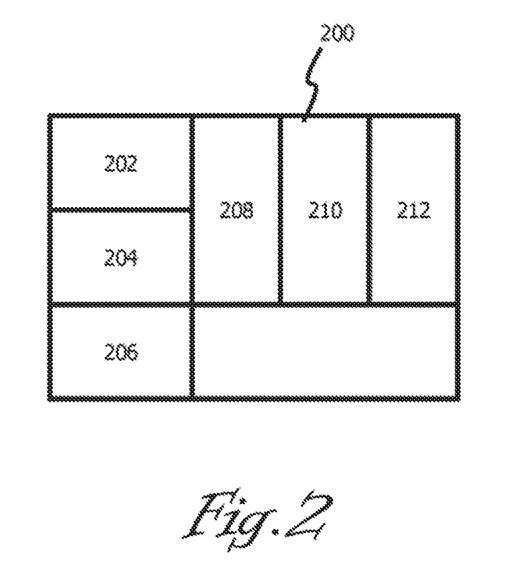
FIG. 2 is a block diagram of a computing device configured with a planner system that can automatically position the set of vehicles.

FIG. 2 is a block diagram of a computing device 200. This type of computing device may be installed on board at least one of the vehicles 102 (e.g. comprising part of control system 104) and/or may be located remotely from the vehicles (e.g. at a land base) and be in communication with the control systems of the vehicles in order to autonomously position them. In some embodiments, the computing device 200 can be part of the planner system 105 that can command and control unmanned off-board systems. This system may be in communication with a mission planning tool that formulates mission plans for off-board systems by decomposing the mission objectives, as stated by an operator, into tasks that are assigned to the available assets and the execution times of which are scheduled. The decomposition step can encode tactics and standing orders.

The computing device 200 typically includes a processor 202 and a memory 204. The computing device can further include at least one communications interface 206 that allows it to transfer data to/from other devices, such as computing devices/control systems 104 installed onboard one or more of the (other) vehicles 102. The communications interface will typically provide wireless communication over a communications network and may transfer data in an encrypted manner. The computing device may comprise further conventional components, such as a display, user interface, external storage, etc, that need not be described here in detail. In some cases the components and/or functions of the computing device may be distributed.

The memory 204 is shown as schematically comprising/communicating with software components that form at least part of a planner system. In some embodiments the planner system is a mission planning and optimisation tool that aims to extend a Combat Management System's (CMS) functionality to enable the CMS to command and control unmanned off-board systems. Embodiments of the planner system can formulate mission plans for off-board systems by decomposing the mission objectives, as stated by the operator, into tasks that are assigned to the available assets and the execution times of which are scheduled.

In some embodiments three components of the planner system can interact in order to determine the task assignments and the task execution schedule: a task assignment algorithm 208; a scheduler 210, and a cost function 212. The task assignment algorithm 208 can provide a (full or partial) assignment of tasks (e.g. moving within a predetermined proximity of a set of moving targets) to actors (e.g. the at least partially autonomous vehicles 102). The scheduler 210 can compute the (optimal in some cases) task execution schedule for a given (full/partial) assignment. The cost function 212 can attribute a scalar cost value to the proposed assignment and schedule. All or some of these components may be implemented using GNU Linear Programming Kit available at https://www.gnu.org/software/glpk/, for example. The task assignment algorithm can propose a new assignment and subsequently build or select the final assignment based on the received cost values. It will be understood that the task assignment algorithm 208 and the cost function 212 are optional, and embodiments may comprise the scheduler 210, which can operate independently of other components in some cases.

Figure 3:
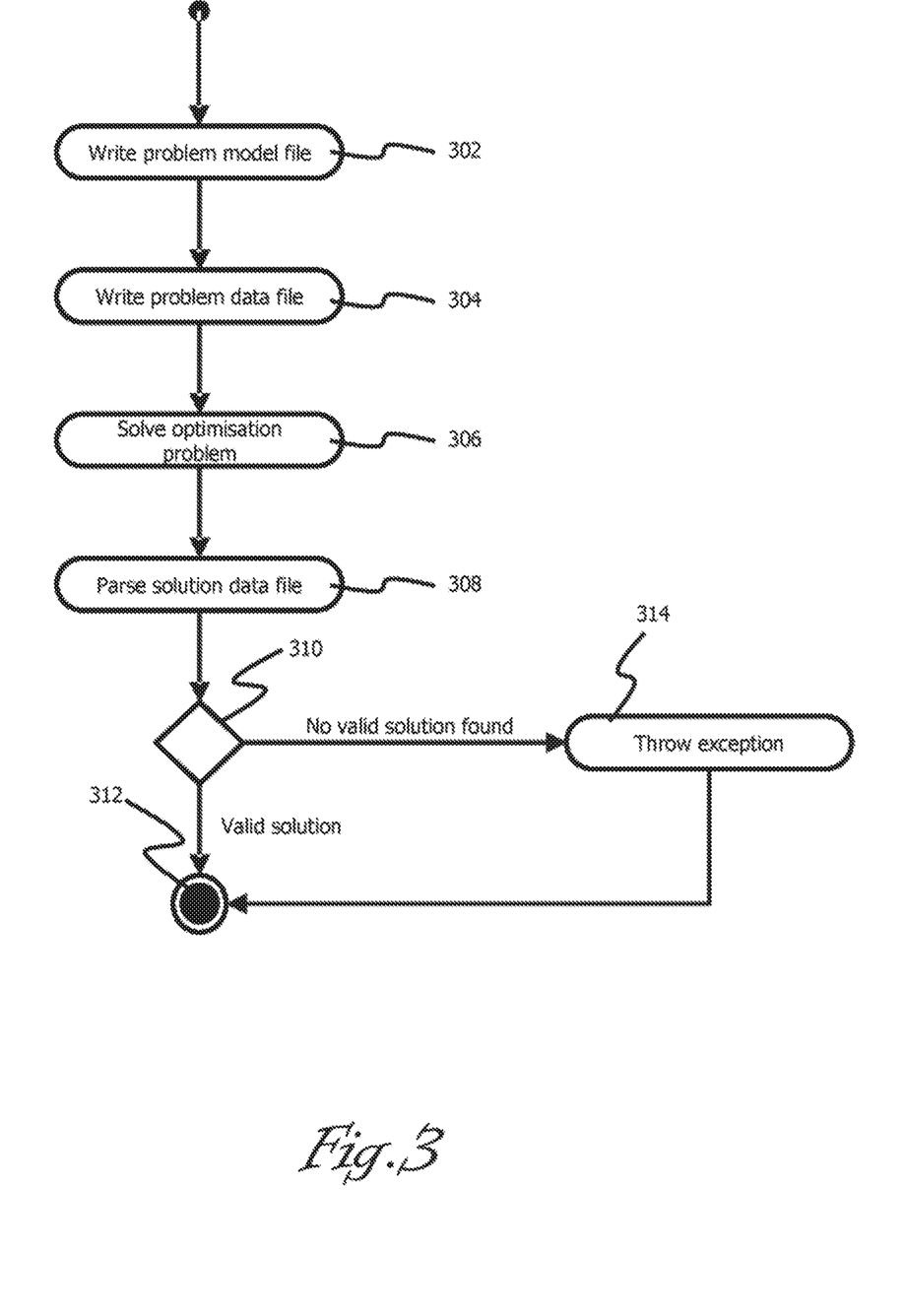
FIG. 3 is a flowchart outlining operations performed by a scheduler component of the planner system according to an example embodiment.

FIG. 3 is a flowchart illustrating steps that can be performed by an example embodiment, e.g. by code of the scheduler component 210 executing on the computing device 200. Example embodiments may implement an embodiment of the scheduler in the form of an optimization problem, and may use an external optimization solver, such as GLPK (GNU Linear Programming Kit). Various optimisation techniques may be used by embodiments, e.g. a heuristic or annealing technique. However, it should be understood that embodiments are not limited to optimization/Linear Programming approaches. An example of an alternative embodiment will be given below with reference to FIGS. 5-6. Thus, it will be understood that at least some of the steps of FIG. 3 are optional.

It will also be appreciated that the illustrated steps of the flowcharts herein are exemplary only and in alternative embodiments some of them may be omitted, re-ordered and/or performed concurrently rather than sequentially. Further, additional steps (not illustrated) may be performed. The skilled person will understand that the steps can be implemented by hardware and/or software, using any suitable programming languages/techniques and data structures, where appropriate. The method may be started and/or terminated by a user, or automatically when certain conditions are met, e.g. based on external control signals being received.

At step 302 embodiments can write a problem model file. This file can contain data such as the initial position(s) (and in some cases velocity) of each of a set of one or more vehicles 102; the maximum velocity of each of the set of one or more vehicles; the initial position(s) of each of a set of one or more moving target(s) 106; the initial/constant velocity of each of the set of one or more moving target(s). This file can be created by a programmer and can provide an implementation of the optimisation problem. It will be understood that in alternative embodiments this information can be represented/processed using any suitable data structure(s).

At step 304 embodiments can write a problem data file. This file can contain data such as an ordered set/list of (one or more of) the moving targets 106A-106C to be targeted by one or more of the vehicles 102A, 102B. This file can contain the problem-specific coefficients and may be created automatically by a suitable piece of software, or manually by a programmer. The order may be determined in any suitable manner, e.g. the initial position of a moving target with respect to a particular location, user-assigned based on priority, etc. It will be understood that in alternative embodiments this information can be represented/processed using any suitable data structure(s).

At step 306 embodiments can use the files written at steps 302 and 304 to generate a schedule, e.g. by solving an optimization problem. The output of this step can comprise a solution data file (or other data structure) that comprises for each of the vehicles an ordered set/list of time/location pairs (as detailed below) representing a best solution/attempt at having each of the vehicles fulfil its tasks.

At step 308 embodiments can parse the solution data file, e.g. convert to signals that can be used as control signals for the vehicles 102. This parsing can be performed by general purpose solvers, such as GLPK, and can further comprise checking at step 310 whether the time/location pairs fulfil all the tasks assigned to the vehicles. For instance, in some cases the tasks (interception of the moving targets in their listed order) may not be achievable by a vehicle, e.g. due to an in sufficient maximum velocity.

If the check of step 310 indicates that tasks are fulfilled then control passes to step 312, where data from the solution data file may be used to position the vehicle(s). This can involve sending signals to the control system(s) 104 of the vehicle(s) 102 in order to directly control the positions of the vehicle(s) based on the computation results. Additionally or alternatively, this can include displaying information to assist a (local or remote) operator with controlling the positions of one or more of the vehicles and/or for simulation purposes. Such operations may be done substantially in real-time as the method is executed, or data based on the computation results may be stored for future use. In some cases, embodiments of the method may be performed in order to plan before a mission, e.g. repeat its calculations for future nominal time steps. In other cases, embodiments of the method may be performed initially in order to plan while the mission is being executed, then after a period of time/ waiting its calculations are repeated so that the positions for the vehicles are recomputed based on up-to-date information.

If the time/location pairs do not fulfil all (or some of) the tasks then control may pass to step 314, where a suitable action is taken, e.g. generating an exception message so that a user can take appropriate alternative action (e.g. replace one or more of the vehicles with ones having a higher maximum velocity).

Figure 4:
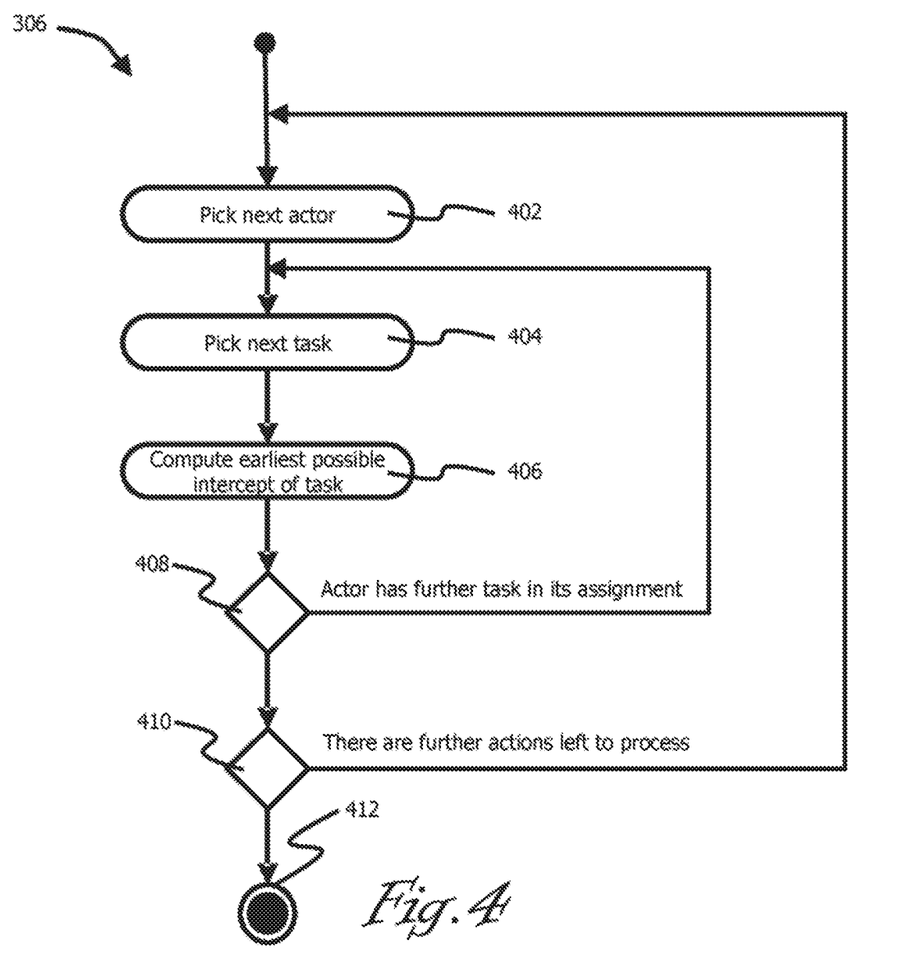
FIG. 4 is a flowchart detailing operations performed by an embodiment of the scheduler.

FIG. 4 is a flowchart illustrating steps that can be performed by an embodiment in order to perform the scheduling operation 306. Embodiments can receive relevant information regarding a set of (one or more) vehicles and a set of moving targets in relation to which the set of vehicles is/are to perform tasks. Typically, a task will involve moving a vehicle to a location that is within a predetermined proximity of one of the moving targets, e.g. in order to perform an observation operation or the like. The predetermined proximity may be a fixed value (e.g. expressed as a straight-line distance or radius from the position of a target), including zero (e.g. where the vehicle is to substantially physically contact the target). Alternatively, it may be updatable by an operator and/or automatically, e.g. depending on real-time factors, such as velocity of the target; type of action to be performed, such as observe from a minimum/maximum distance away, collide, jam communications from a distance, etc) to be taken, and so on. The received information can include data such as the initial position and maximum velocity of the vehicle(s) in the set, and the initial positions and constant velocities of the moving targets in the set. The information may be obtained from the problem model and problem data files discussed above, or some other data structure/source.

At step 402 embodiments can select a first one of the vehicles in the set, typically the first one listed in an ordered list that comprises the set of vehicles. However, in some embodiments this may vary, e.g. based on an updated priority value assigned to a particular vehicle.

At step 404 embodiments can select a first task, e.g. moving the selected vehicle to a location that is within the predetermined proximity of the first moving target listed in the ordered list that comprises the set of moving targets.

At step 406 embodiments can compute at least an estimated time when the selected vehicle should move to a location that is within the predetermined proximity of the selected task's moving target. In some cases, this estimated time may comprise the earliest possible time when the vehicle can move to that location. Examples of the computations that can achieve this are described below.

At step 408 embodiments can check whether the selected vehicle has further tasks to perform. It is has then control passes back to step 404, where the next task (e.g. moving to a location that is within the predetermined proximity of a second moving target listed in the ordered list) is selected. If the check performed at step 408 indicates that the selected vehicle has no further tasks to perform then control passes to step 410.

At step 410 embodiments can check whether there are further vehicles in the set of vehicles. If there is then then control can pass back to step 402, where the next vehicle (e.g. the second vehicle listed in the ordered list of vehicles) is selected. If there are no further vehicles then control can pass to step 412.

At step 412 embodiments can output data relating to the estimated times and locations computed at step 406 for storage and/or processing.

Figure 5:
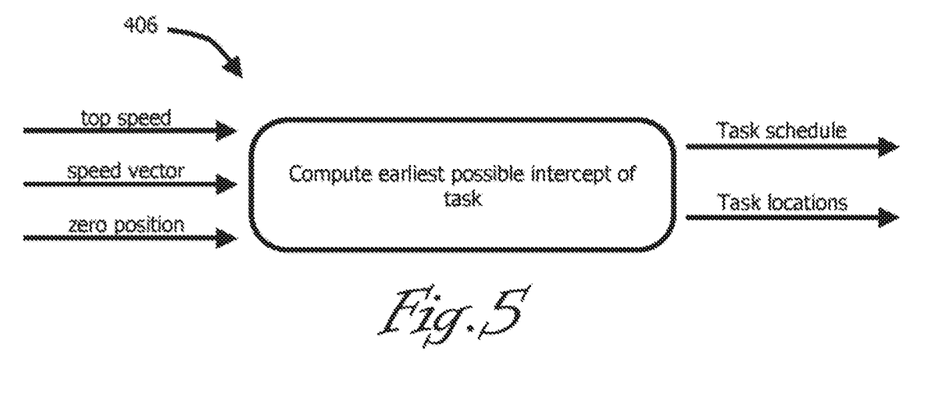
FIG. 5 is a block diagram illustrating inputs and outputs of a compute estimated time/location operation performed by the scheduler.

As illustrated in FIG. 5, embodiments can use the selected vehicle's maximum speed, $v_{max}$, the position of the selected task's target at zero time, $r_x(0)$, as well as the speed vector, $v_x$, of the selected task's target as initial inputs. Embodiments typically produce two outputs: the task execution times for all tasks (e.g. a schedule indicating when each vehicle will move to a location within the predetermined proximity of each of its assigned targets), and the task locations for each task (e.g. a list of positions to where each vehicle will move in order to be within the predetermined proximity of each of the assigned targets). The time can be represented in any suitable manner (e.g. ms or s from a counter start, hour/minute/second in a particular time zone, etc), as can the location (e.g. X, Y positions with respect to a representation of the environment, marine or geographical map/grid reference, etc). The task locations are normally a function of the task execution times, e.g. by assuming straight line motion. The task execution times for two consecutive tasks cannot usually be freely chosen but must be constrained in order to achieve a viable mission. The task execution times of two consecutive tasks must be chosen such that the velocity of motion required to travel from one task location to the other is equal to, or less than, the vehicle's maximum top speed.

Figure 6:
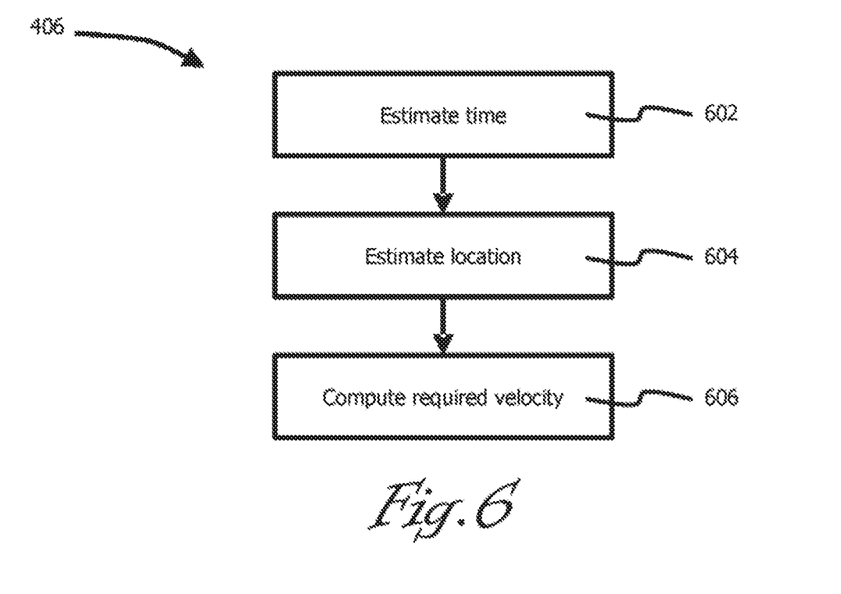
FIG. 6 is a flowchart detailing the compute estimated time/location operation of the example embodiment.

FIG. 6 is a flowchart showing examples of steps involved in the compute estimated time/location operation 406 of an example embodiment.

At step 602 embodiments can estimate an initial positive time, $t_x$, for the task's execution. That is, embodiments can compute an initial estimated time for the selected vehicle to be positioned within a predetermined proximity of the selected moving target. This can be done initially by selecting a range-limited random value or a default value, for example.

At step 604 embodiments can compute the estimated location of the task's target at the estimated time, $r_x=f(t_x)$. That is, embodiments can compute an estimated location of the selected target at the estimated time, based on the current position and the constant velocity of the moving target.

At step 606 for a given pair of the estimated time and the estimated location, embodiments can compute the velocity required to move the selected vehicle from its current position to the estimated location in order to arrive at the estimated time. If the required speed is greater than the vehicle's maximum speed then the task's execution time needs to be increased by a small amount (one or more). In other embodiments, the time value may be incremented/ decremented by certain steps, or adjusted in some other manner. If the required speed equals the vehicle's maximum speed then it can be considered that the optimal value has been found. At least the estimated time and the estimated location may be output for further processing.

As indicated in FIG. 4, the above steps can be repeated for each vehicle and task combination, with the vehicle's previous location being assumed to be the location of the target of the previous task.

In an example where there is a set comprising two vehicles 102A, 102B, with three tasks each relating to sets of moving targets 106A-106C and 106D-106F (e.g. first vehicle 102A has [Task_0, Task_1, Task_2] and second vehicle 1026 has [Task_3, Task_4, Task_5]) the operations can be as follows:

For the first vehicle 102A and Task_0, no previous location exists and so $t_0=0$ and $r_0=r_0(0)$.

For the first vehicle 102A and Task_1, a value is picked for $t_1$, $r_1=r_1(0)+v_1*t_1$ is computed as a result and the travel speed is given by: $v_{0,1}=(r_1-r_0)/(t_1-t_0)$.

For the first vehicle 102A and Task_2, a value is picked for $t_2$, $r_2=r_2(0)+v_2*t_2$ is computed as a result and the travel speed is given by: $v_{1,2}=(r_2-r_1)/(t_2-t_1)$ And so on.

Some embodiments of the scheduler can use a Linear Programming approach to generate the schedule by solving an optimization problem (e.g. using a processor executing an optimization solver, such as GLPK). Such embodiments can use the following optimization variables, for example:

| | |
|---|---|
| t | Task execution time, i.e. t(i) = x denotes that the executing asset arrives at the $i^{th}$ task x seconds after mission start. |
| p | Task positions, i.e. p(i) = [x, y] denotes that the $i^{th}$ task is located at position [x, y] at time $t_i$ = x (execution time) |
| $t_{end}$ | Mission completion time for each asset, i.e. $t_{end}(i)$ = x denotes that the $i^{th}$ asset completes it's last task at time x. |
| $t_{start}$ | Mission start time for each asset, i.e. $t_{end}(i)$ = x denotes that the $i^{th}$ asset starts it's first task at time x. |
| Dp | Inter-task distance matrix, dp(i, j) = [dx, dy] denotes that the distance vector [dx, dy] between the $i^{th}$ and $j^{th}$ tasks at their respective execution times. |
| Dt | time difference between tasks, dt(i, j) = x denotes that the execution times of task i and task j differ by an amount of x, i.e. t(j) – t(i) = x |

These variables can be used for solving an optimisation problem that can be expressed using the following expression:

$$\underset{t,\, p,\, dp,\, dt,\, t_{start},\, t_{end}}{\text{minimise}} \quad f = \sum_{i=1}^{NV} t_{end}(i) - t_{start}(i) + 0.001 \cdot t(i)$$

Constraints of the optimisation problem can include: link task execution times to the execution order in the assignment matrix; link task position to execution time; inter-task distances (substitution); temporal difference (substitution); temporal and spatial separation between tasks based on schedule; time vector magnitudes, and/or task positions.

The task execution order may be represented using the following terms:

Let x be a constant matrix of task assignments, with x[a,i,j]=1 indicating that the $a^{th}$ vehicle executes task j after executing task i.

Let $n_t$ be the total number of tasks and let $n_v$ be the total number of vehicles The constraint is thus expressed as $$\forall i \in \begin{bmatrix} 1 \cdots n_t \end{bmatrix}, \forall j \in \begin{bmatrix} 1 \cdots n_t \end{bmatrix}, \forall a \in \begin{bmatrix} 1 \cdots n_v \end{bmatrix} \text{ with } x(a, i, j) = 1$$

$$t(i) \le t(j)$$

The constraint above can ensure that the execution time of two tasks, which are executed by the same vehicle and in the order of i before j, have the correct relation, i.e. t(i) is less than or equal to t(j).

The positions of the targets of the tasks can be represented using the following terms:

Let $p_0$ be a constant matrix of task positions at t=0 and let v be a matrix of velocities.

Let $n_t$ be the total number of tasks $\forall i \in [1 \ldots n_t]$ $p(i,1)=p_0(i,1)+v(i,1) \cdot t$ $p(i,2)=p_0(i,2)+v(i,2) \cdot t$ The constraint above can ensure that the position of each task is correctly related to the task's execution time. The position is computed as the linear extrapolation from the task's position a t=0 with the velocity, v, of the target of the task.

The spatial and temporal separation of the tasks can be reflected by the list of variables, where dp represents the difference vector of task location and dt represents the difference of execution time. In embodiments it can be assumed that the time difference is fixed, i.e. two tasks that are executed sequentially by the same vehicle/actor are separated in time by x seconds. Based on the maximum speed, $v_{max}$, of a vehicle the distance between the tasks must be less than $v_{max}dt$. Hence, the magnitude of the vector dp is limited by $v_{max}dt$.

Figure 7:
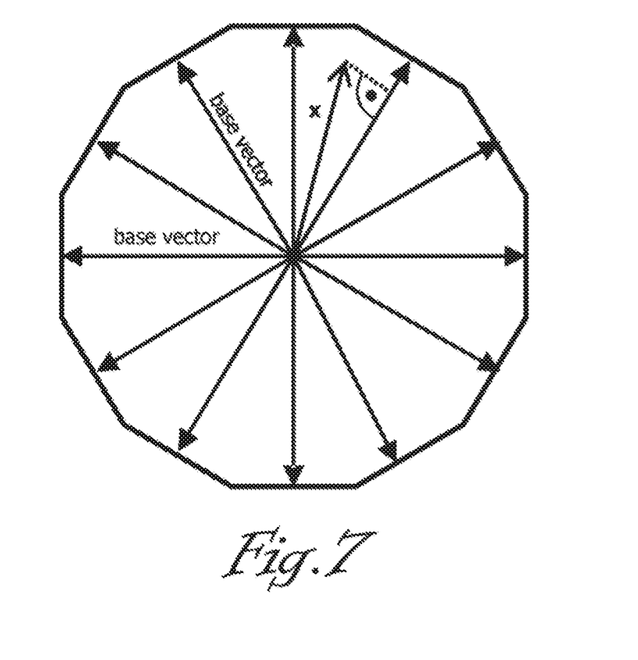
FIG. 7 shows a circle approximated by polygons that illustrates computations performed by another embodiment.

FIG. 7 shows a notional circle approximated by polygons that illustrates computations performed by the embodiment. Let M be the number of base vectors used in the circle approximation. A vector magnitude limit can be implemented by forcing the vector to reside within the area of the notional circle approximated by a polygon. Let M be the number of polygon edges used in the approximation:

$$m \in \begin{bmatrix} 1 \cdots M \end{bmatrix}, i \in \begin{bmatrix} 1 \cdots n_t \end{bmatrix}, \forall j \in \begin{bmatrix} 1 \cdots n_t \end{bmatrix},$$

$$\forall a \in \begin{bmatrix} 1 \cdots n_v \end{bmatrix}, x(a, i, j) = 1 \text{ and } i \ne j$$

$$dp(i, j, 1) \cdot \sin\left(\frac{2\pi m}{M}\right) + dp(i, j, 2) \cdot \cos\left(\frac{2\pi m}{M}\right) \le dt(i, j) \cdot v_{max}$$

The equation above represents a key constraint that can be used by embodiments of the scheduler.

The skilled person will appreciate that alternative embodiments can be produced in order to deal with variations, such as tasks with a non-zero duration; temporal constraints on tasks; tracks that do not move in a straight line, e.g. piecewise straight lines, and/or tracks that have a future position probability (tasks are scheduled and positioned, such that the likelihood of intercepting the target is maximised).

Embodiments can provide advantages, including allowing implementation on vehicles with limited autonomy and capability, e.g. waypoint following only, thereby enabling users to acquire such vehicles from a greater range of suppliers.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer-implemented method of positioning a vehicle in relation to each moving target of an ordered set of moving targets, wherein each of the moving targets moves from a respective initial position at a respective constant velocity, the method comprising:
   i) computing, by selecting a range-limited random value, an estimated time ($t_x$);
   ii) computing, based on a current position of the moving target and the constant velocity of the moving target, an estimated location ($r_x$) of the moving target at the estimated time ($t_x$);
   iii) computing a required velocity for the vehicle to move from its current position to reach a location within a predetermined proximity of the estimated location ($r_x$) of the moving target by the estimated time ($t_x$);
   iv) if the required velocity is less than or equal to a maximum velocity of the vehicle, outputting the estimated time and the estimated location for use in positioning the vehicle; and
   if the required velocity is greater than the maximum velocity of the vehicle, increasing the estimated time ($t_x$), and repeating ii)-iv).

2. The method according to claim 1, further comprising repeating i)-iv) for each subsequent moving target in the set, wherein the current position of the vehicle is taken to correspond to the estimated location of a previous moving target in the set.

3. The method according to claim 1, comprising repeating i)-iv) for a plurality of vehicles, where each of the plurality of vehicles is associated with its own ordered set of moving targets.

4. The method according to claim 3, wherein i)-iii) at least are performed by solving an optimisation problem.

5. The method according to claim 4, wherein the optimisation problem comprises determining/seeking:
   a first time and a first position, and a second time and a second position, which meet the following conditions
   the first position is within a predetermined proximity of a location of the first moving target at the first time,
   the second position is within the predetermined proximity of a location of a second moving target at the second time, and
   a distance between the first position and the second position is no greater than a distance the vehicle can travel at, or below, a maximum velocity of the vehicle for a duration equal to or less than a difference between the second time and the first time, and/or a difference between the second time and the first time is no greater than a time taken for the vehicle to travel from the first position to the second position at, or below, a maximum velocity of the vehicle.

6. The method according to claim 4, wherein the optimisation problem is represented by an expression $$\underset{t,\, p,\, dp,\, dt,\, t_{start},\, t_{end}}{\text{minimise}} \quad f = \sum_{i=1}^{NV} t_{end}(i) - t_{start}(i) + 0.001 \cdot t(i)$$

wherein:
   t represents the estimated time;
   p represents a position of a said moving target, where p(i)=[x, y] denotes that the $i^{th}$ moving target is located at position [x, y] at time $t_1$=x;
   $tt_{end}$ represents task completion time for each of the plurality of vehicles;
   $t_{start}$ represents a start time for each of the plurality of vehicles;
   Dp represents an inter-task distance matrix, where dp(i,j)=[dx, dy] denotes that a distance vector [dx, dy] between the $i^{th}$ and $j^{th}$ moving targets at their respective execution times; and
   Dt represents time difference between interception of the moving targets by a said vehicle, where dt(i, j)=x denotes that the execution times of moving target i and moving target j differ by an amount of x.

7. The method according to claim 6, wherein a constraint on solutions to the optimisation problem is expressed by $$m \in \left[1 \cdots M\right], i \in \left[1 \cdots n_t\right], \forall j \in \left[1 \cdots n_t\right],$$

$$\forall a \in \left[1 \cdots n_v\right], x(a, i, j) = 1 \text{ and } i \neq j$$

$$dp(i, j, 1) \cdot \sin\left(\frac{2\pi m}{M}\right) + dp(i, j, 2) \cdot \cos\left(\frac{2\pi m}{M}\right) \leq dt(i, j) \cdot v_{max}$$

wherein:
   M represents a number of polygon edges used in a notional circle approximated by polygons, with a vector magnitude limit being implemented by forcing a vector to reside within an area of the notional circle; and $V_{max}$ represents the maximum velocity.

8. The method according to claim 4, wherein the optimization problem is solved using a processor executing a Linear Programming optimization solver.

9. A system adapted to position a vehicle in relation to a set of moving targets, the system comprising at least one processor configured to:
   i) compute, by selecting a range-limited random value, an estimated time ($t_x$);
   ii) compute, based on a current position of the moving target and the constant velocity of the moving target, an estimated location ($r_x$) of the moving target at the estimated time ($t_x$);
   iii) compute a required velocity for the vehicle to move from its current position to reach a location within a predetermined proximity of the estimated location ($r_x$) of the moving target by the estimated time ($t_x$);
   iv) if the required velocity is less than or equal to a maximum velocity of the vehicle, output the estimated time and the estimated location for use in positioning the vehicle; and
   if the required velocity is greater than the maximum velocity of the vehicle, increase the estimated time ($t_x$), and repeat ii)-iv).

10. The system according to claim 9, further including a communications interface configured to transfer signals representing the estimated time and the estimated location to at least one vehicle.

11. A vehicle including the system according to claim 9.

12. The vehicle according to claim 11, wherein the vehicle is at least partly autonomous.

13. The vehicle according to claim 11, wherein the vehicle comprises a water-borne vessel.

14. A computer program product including one or more non-transitory machine-readable mediums encoded with instructions that when executed by one or more processors cause a process to be carried out for positioning a vehicle in relation to each moving target of an ordered set of moving targets, wherein each of the moving targets moves from a respective initial position at a respective constant velocity, the process comprising:
   computing, by selecting a range-limited random value, an estimated time ($t_x$);
   computing, based on a current position of the moving target and the constant velocity of the moving target, an estimated location ($r_x$) of the moving target at the estimated time ($t_x$);
   computing a required velocity for the vehicle to move from its current position to reach a location within a predetermined proximity of the estimated location ($r_x$) of the moving target by the estimated time ($t_x$);
   in response to the required velocity being less than or equal to a maximum velocity of the vehicle, outputting the estimated time and the estimated location for use in positioning the vehicle.

15. The computer program product of claim 14, the process further comprising:
   in response to the required velocity being greater than the maximum velocity of the vehicle, increasing the estimated time ($t_x$);
   computing, based on a current position of the moving target and the constant velocity of the moving target, an estimated location ($r_x$) of the moving target at the estimated time ($t_x$);
   computing a required velocity for the vehicle to move from its current position to reach a location within a predetermined proximity of the estimated location ($r_x$) of the moving target by the estimated time ($t_x$); and
   in response to the required velocity being less than or equal to a maximum velocity of the vehicle, outputting the estimated time and the estimated location for use in positioning the vehicle.

16. The computer program product of claim 14, the process further comprising repeating the process for each subsequent moving target in the set, wherein the current position of the vehicle is taken to correspond to the estimated location of a previous moving target in the set.

17. The computer program product of claim 14, the process comprising repeating the process for a plurality of vehicles, where each of the plurality of vehicles is associated with its own ordered set of moving targets.

18. The computer program product of claim 17, wherein the computing comprises solving an optimisation problem.

19. The computer program product of claim 18, wherein the optimisation problem comprises determining:
   a first time and a first position, and a second time and a second position, which meet the following conditions
      the first position is within a predetermined proximity of a location of the first moving target at the first time,
      the second position is within the predetermined proximity of a location of a second moving target at the second time, and
      a distance between the first position and the second position is no greater than a distance the vehicle can travel at, or below, a maximum velocity of the vehicle for a duration equal to or less than a difference between the second time and the first time, and/or a difference between the second time and the first time is no greater than a time taken for the vehicle to travel from the first position to the second position at, or below, a maximum velocity of the vehicle.

20. The computer program product of claim 18, wherein the optimisation problem is represented by an expression $$\underset{t,\, p,\, dp,\, dt,\, t_{start},\, t_{end}}{\text{minimise}} \quad f = \sum_{i=1}^{NV} t_{end}(i) - t_{start}(i) + 0.001 \cdot t(i)$$

wherein:
   t represents the estimated time;
   p represents a position of a said moving target, where $p(i)=[x, y]$ denotes that the $i^{th}$ moving target is located at position [x, y] at time $t_i=x$;
   $tt_{end}$ represents task completion time for each of the plurality of vehicles;
   $t_{start}$ represents a start time for each of the plurality of vehicles;
   Dp represents an inter-task distance matrix, where $dp(i,j)=[dx, dy]$ denotes that a distance vector [dx, dy] between the $i^{th}$ and $j^{th}$ moving targets at their respective execution times; and
   Dt represents time difference between interception of the moving targets by a said vehicle, where $dt(i, j)=x$ denotes that the execution times of moving target i and moving target j differ by an amount of x.

* * * * *